US007667570B1

(12) United States Patent
Adams

(10) Patent No.: US 7,667,570 B1
(45) Date of Patent: Feb. 23, 2010

(54) NANOSTRUCTURED COMBINATION KEY-LOCK

(75) Inventor: Christian Adams, Yalaha, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 857 days.

(21) Appl. No.: 11/128,505

(22) Filed: May 12, 2005

Related U.S. Application Data

(60) Provisional application No. 60/572,841, filed on May 19, 2004.

(51) Int. Cl.
*G06F 7/04* (2006.01)

(52) U.S. Cl. ....................... 340/5.6; 340/5.74; 340/542; 70/25; 70/120; 70/71

(58) Field of Classification Search .................. 340/5.6, 340/5.67, 542; 70/25, 120, 71
See application file for complete search history.

(56) References Cited

U.S. PATENT DOCUMENTS 4,677,435 A 6/1987 Causse d'Agraives et al.
5,772,760 A * 6/1998 Gruen et al. ................ 117/104
6,309,363 B1 * 10/2001 Chen et al. .................. 600/587
6,482,517 B1 * 11/2002 Anderson .............. 428/402.24
6,741,360 B2 5/2004 D'Agraives et al.
6,748,748 B2 * 6/2004 Bradley et al. ............... 62/46.1
6,974,640 B2 * 12/2005 Gell et al. ................... 428/701
2004/0000634 A1 1/2004 Ballard

FOREIGN PATENT DOCUMENTS

EP 172765 B1 10/1989
WO WO98/10324 3/1998

OTHER PUBLICATIONS

"Nano-Tribometer", http://www.microphotonics.com/nanotribo.html, 1-4.

* cited by examiner

*Primary Examiner*—Vernal U Brown
(74) *Attorney, Agent, or Firm*—Jeffrey D. Myers; Peacock Myers, P.C.; Timothy D. Stanley

(57) ABSTRACT

A lock and key mechanism comprising a sensor detecting friction between first and second nanostructured surfaces and a controller receiving output from the sensor and comparing same to stored values. Also a method for activating or deactivating a lock comprising providing a first nanostructured surface, causing a second nanostructured surface to frictionally interact with the first nanostructured surface, sensing the interaction with a sensor, the sensor producing an output signal, and via a controller comparing the sensor output signal to a reference signal.

20 Claims, 5 Drawing Sheets

NANOSTRUCTURED COMBINATION KEY-LOCK

CROSS-REFERENCE TO RELATED APPLICATIONS

This application claims priority to and the benefit of the filing of U.S. Provisional Patent Application Ser. No. 60/572,841, entitled "Nanostructured Combination Key-Lock", filed on May 19, 2004, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to a key and lock mechanism employing the frictional interaction of a plurality of surfaces having nanostructures disposed thereon, a phenomenon first reported in Project # 4582.1, "Friction reduction and control via nanopatterning", Laboratory for Surface Science and Technology at the Swiss Federal Institute of Technology, Zurich, Switzerland (April 2003).

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Previously, locks have been susceptible to unauthorized tampering. The chief manner in which unauthorized persons have gained access to these locks is by using a device which mimics a key to the lock. For example, it has been known for quite some time how to pick standard tumbler type locks by using one or more small pick-like devices. An unauthorized person can also easily make a copy of the original key by simply taking it to any local hard-ware store.

The key-card locks, which have also become common, typically employ a magnetic strip. The magnetic strip is programmed with a particular sequence which a pre-programmed electronic lock will recognize. Due to their common usage, these cards are now easily copied through the use of any commercially available magnetic key programming unit.

Sensitive data and secured access points which employ the previously described locks are at risk for unauthorized access. Unauthorized access to the data and items "secured" by such locks can have extremely negative and even lethal effects.

There is thus a present need for a lock mechanism which utilizes a key which is exceedingly difficult to reproduce.

There is also a need for a lock mechanism which is virtually impossible to deactivate without the original key.

Previous arguably related technologies employ a means of determining a micropattern using optical means or investigating texture of a single surface. Optical means include a charged couple device or a "scanner" as reader with light-emitting diode (LED) or other means of illumination. It is by illumination of a certain unique pattern that a "fingerprint" is resolved. It is then digitized and compared to an internally stored reference.

The present invention implements nanostructured grating or nanopatterned features on the surface of two or more surfaces, such as plastic films. When the two films slide along each other at a constant velocity a sinusoidal friction force pattern is generated. This effect is known as "superkinetic friction," and is a function of the line spacing or pattern found in the nanostructure. This "superkinetic friction" is a phenomenon only recently elucidated. It is not a function of refracted light, nor can the information held in a key using this new technology be determined using an optical method. Furthermore, a second nanostructured grating or nanopatterned surface must come in physical contact with the first in order for the phenomenon as described here to be produced.

Exemplary of the prior art are the following references. Patent Cooperation Treaty Publication No. WO98/10324, to Tompkin, et al., published Mar. 12, 1998, provides optical security features, noting in the Abstract that: "Surface patterns of this type are suitable as optical security features for protecting identity cards or objects of all kinds."

U.S. Pat. No. 6,741,360, to D'Agraives, et al., also relies on only one surface with an optical method for determining an interference pattern. The particular method employed is "speckle interferometry." This method also requires a coherent light source, preferably a laser in order for the optical method to work.

U.S. Pat. No. 4,677,435, to D'Agraives, et al., reads single micro-textured surfaces via a mechanical means, such as a reader or piezoelectric probe, to determine if a texture is the right key. This is distinct from interfacing two nanostructured/nanopatterned surfaces that generate a unique friction pattern when movement occurs and is properly measured.

U.S. Patent Publication No. 2004/0000634, to Ballard, cites "image signal" repeatedly, along with "scanner," "light emitting diodes," "photo detectors," and other kinds of imaging/illumination equipment. It also refers to surface features (on only one surface) in the range of 5-500 micrometers. The present invention preferably employs a feature size of less than or equal to approximately 4 microns in pitch and 1 micron in depth, most preferably approximately 3 and 0.5 microns, respectively.

Again, the present invention is distinct in several ways, including: (1) is a function of one nanostructured patterned object coming in contact (sliding) with another nanostructured patterned object; (2) utilizes a phenomenon that occurs at a specific sliding speed in order for the proper signal to be generated; different "superkinetic friction" signals are generated at different sliding speeds; (3) is unique because further variation in the aforementioned signal can be measured by changing the angle by which the two surfaces contact each other, thus the additional function as a combination lock with an infinite variety of signals resulting from different angles of interaction; and (4) is not in any way dependant on an optical mechanism to elucidate the pattern.

BRIEF SUMMARY OF THE INVENTION

The present invention is of a lock and key mechanism comprising: a sensor detecting friction between first and second nanostructured surfaces; and a controller receiving output from the sensor and comparing same to stored values. In the preferred embodiment, an amplifier is placed between the sensor and the controller. The first surface is preferably disposed on an element which is fixedly secured within an enclosure, and the second surface is preferably disposed on a structure which is not fixedly secured within an enclosure. The sensor preferably comprises a tribometer, and detects friction between engaging features with a feature size of less than or equal to approximately 4 microns in pitch and 1 micron in depth, most preferably approximately 3 in pitch and 0.5 microns in depth. The first and second surfaces can also be rotatably positionable with respect to one another, wherein the controller requires a particular sequence of engagements of the first and second surfaces at a plurality of angles. The controller can also require engagement of both the second and one or more additional surfaces.

The invention is also of a method for activating or deactivating a lock, comprising: providing a first nanostructured surface; causing a second nanostructured surface to frictionally interact with the first nanostructured surface; sensing the interaction with a sensor, the sensor producing an output signal; and via a controller comparing the sensor output signal to a reference signal.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
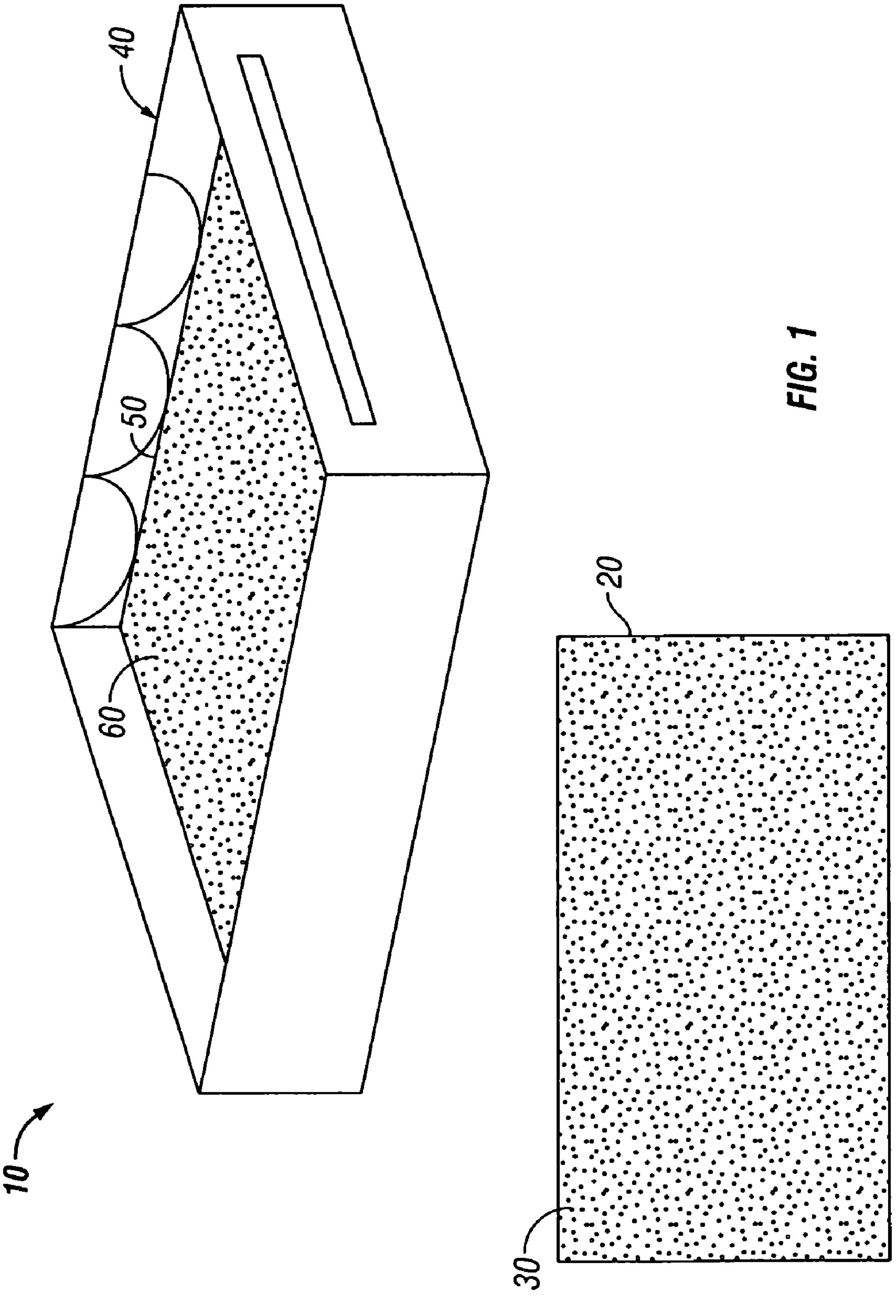
FIG. 1 is an isometric view drawing of the present invention showing the lock mechanism having its top removed, along with a key.

The present invention is directed to a lock and key mechanism, particularly a lock and key mechanism which relies on the frictional interaction of a plurality of nanostructured surfaces. A preferred embodiment comprises a first nanostructured surface, a second nanostructured surface, a sensor, and a microcontroller. The lock and key mechanism can also have an amplifier. The first surface can be disposed on an element which is fixedly secured within an enclosure. The second surface can be disposed on a structure which is not fixedly secured within an enclosure. The present invention preferably employs a feature size of less than or equal to approximately 4 microns in pitch and 1 micron in depth, most preferably approximately 3 and 0.5 microns, respectively, and the terms "nanostructured" and "nanopatterned" refer to features with such sizes.

In another embodiment, the present invention is a lock and key mechanism having a first nanostructured surface, a second nanostructured where the first nanostructured surface is rotatably positionable with respect to the second surface, a sensor, and a microcontroller.

The present invention also relates to a method for deactivating a lock, the method can have the steps of providing a first nanostructured surface, causing a second nanostructured surface to frictionally interact with the first nanostructured surface, sensing the interaction with an electronic sensor, the sensor producing an electrical signal, and providing a microcontroller, wherein the microcontroller compares the sensor produced electrical signal to a reference signal.

Nanostructured grating or nanopatterned features are preferably implemented on two separate surfaces. When the two surfaces slide along each other at a constant velocity a sinusoidal friction force pattern is generated. This effect is known as "superkinetic friction," and is a function of the line spacing or pattern found in the nanostructure. A simple friction sensor/amplifier preferably contacting one of the surfaces embedded into the circuitry monitors the superkinetic friction pattern. The present invention can be built such that only a unique friction pattern or sequence of unique patterns can deactivate a lock. By varying the orientation in which the key and lock surfaces interact, the resultant sinusoidal force pattern is also varied. For example, if the "key" card is circular in shape it can be rotated in-plane to change the resultant superkinetic friction pattern. The accuracy of the invention is only limited by the sensitivity of the friction sensor circuit. Because of the nature of the nanopatterning/nanostructuring duplicating the key is extremely difficult and time consuming. Therefore, the odds of this lock being picked are infinitesimal. Defeating this technology and breaking the lock would require the intruder to not only have access to the physical details of the unique nanostructured surface, but also know other, more traditional details such as the combination of angles of insertion. The odds of the intruder being able to defeat this lock would thus be astronomically low.

The nanostructured pattern is not only inexpensive to create, but allows for the production of truly random and/or chaotic two-dimensional artifacts in the patterning method depending on the sensitivity of the friction sensor/amplifier circuit found within the device, the variations that can be implemented in the plastic surface are virtually infinite.

The term "card" as used throughout the specification and proposed claims is used for the sake of simplicity, and can include virtually any shape, including complex 3-dimensional shapes. For example the card could easily be made into the shape of a typical car key and the internal element would then obviously be shaped in a mating type manner such that it can receive the key, and their microstructured surfaces interact.

Throughout the specification it is disclosed that the present invention is used to "deactivate a lock". This term is not intended to be limited strictly to mechanical locks. Rather, deactivation of a lock can include instance where the present invention simply outputs an electrical signal. This signal can then itself be used to deactivate a locking mechanism, or the signal can be input into a computer, microprocessor, microcontroller, or other similar device which can then electrically lock, unlock, activate and or deactivate one or more systems, devices, networks, apparatuses, computers, etc.

The term "microcontroller" as used throughout the specification and claims is used for the sake of simplicity and is meant to include any electronic device or circuit which is capable of comparing the signal generated by the sensor to a reference value or signal. Thus the term "microcontroller" can include but is not limited to one or more microcontrollers, one or more microprocessors, one or more PALs, one or more GALs, one or more digital logic circuits, or any other circuit (s), device(s), or combinations thereof which are capable of achieving these objectives. The preferred sensor is a tribometer (such as one described at www.microphotonics.com/nanotribo.html), which in turn is preferably miniaturized and integrated into the lock/key mechanism of the invention.

While those skilled in the art will easily recognize that an almost unlimited number of materials can be used which will permit nanostructures to be disposed on their surface, and although all of these can produce desirable results, the material upon which nanostructures are disposed is preferably a plastic material.

Of course the technology disclosed herein can be combined with that of magnetic strip cards and or any other lock and key mechanism, thus resulting in a key and lock mechanism which uses the disclosed technology and one or more of the known technologies.

Figure 2:
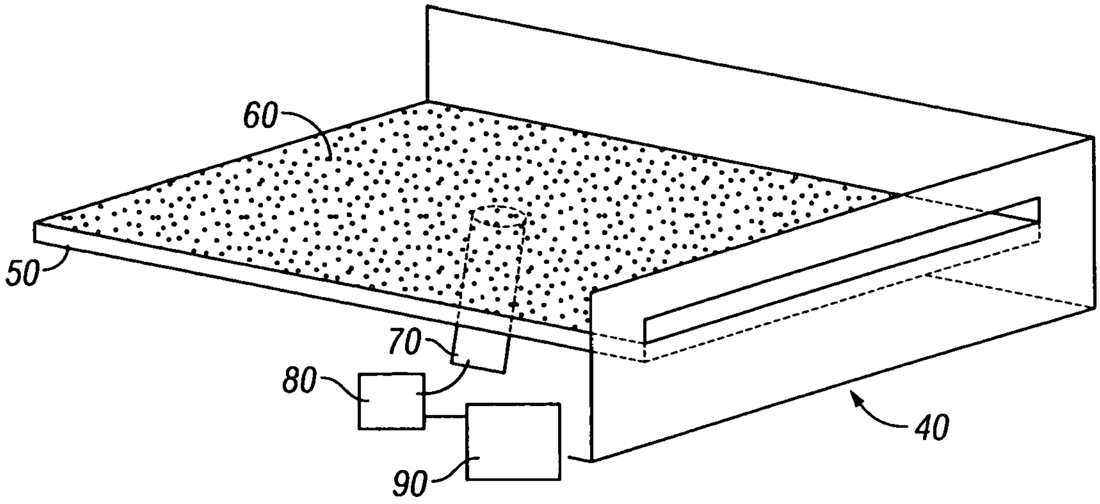
FIG. 2 is an isometric view drawing of the lock mechanism of the present invention showing the sensor connected to an internal element, as well as an amplifier and a microcontroller.
Figure 3:
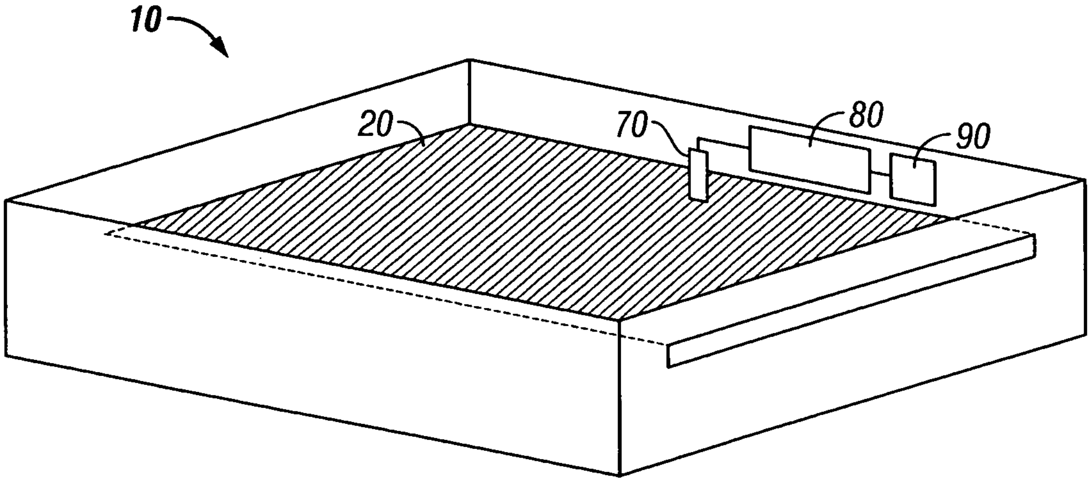
FIG. 3 is an isometric view drawing of the present invention wherein a card is disposed within the lock mechanism, and a sensor detects motion of the card.

As depicted in FIGS. 1-3, the present invention is a lock and key mechanism 10 wherein key 20 has nanostructured surface 30. Lock 40 comprises element 50 which has nanostructured surface 60. Sensor 70 resides in a mutually communicable fashion with element 50. In one embodiment, a user causes nanostructured surface 30 of key 20 to slide across nanostructured surface 60 of element 50 of lock 40. As the nanostructured surfaces of the two cards slide past one another, a unique pattern is generated due to the changing in the distance between the two surfaces. This unique pattern is detected by sensor 70 (preferably a tribometer) and is preferably transmitted to amplifier 80. After amplification, the electrical signal can then be passed to microcontroller 90 where the signal is compared to a known reference signal and or value, and if the a sufficient match is determined to exist, an electrical signal can be produced which deactivates lock 40. Of course, depending on the sensor to be used, amplifier 80 may not be required, rather, if sufficiently strong, the signal generated from sensor 70 can be input directly into an internal analog to digital converter in microcontroller 90.

Virtually any type of sensor can be employed in the present invention and made to produce desirable results. For example, a pressure sensor can be disposed such that it is made to contact either element 50 or key 20, such that as the distance between the two nanostructured surfaces changes, the pressure exerted upon the sensor changes. If, however a magnetic sensor is to be used, it is preferred a magnetized area on a non-nanostructured surface of either element 50 or key 20 be disposed such that the magnetized area is made to travel toward and away from the magnetic sensor. If a light sensor is desired to be used, it is preferred that a constant light source be disposed within lock 40. Light from this source is preferably caused to shine at a reflective surface disposed on element 50 or key 20 at an angle which preferably exceeds 90 degrees. As the reflective surface undulates due to the frictional interaction of the two nanostructured surfaces, the reflected light is preferably made to traverse one or more light sensors. The preceding are only a few of the virtually unlimited manners in which the frictional interaction of the two surfaces can be detected. Those skilled in the art will easily recognize the ability to adapt almost any of the known sensors in such a manner that they are made to detect the interaction of the nanostructured surfaces.

Figure 4:
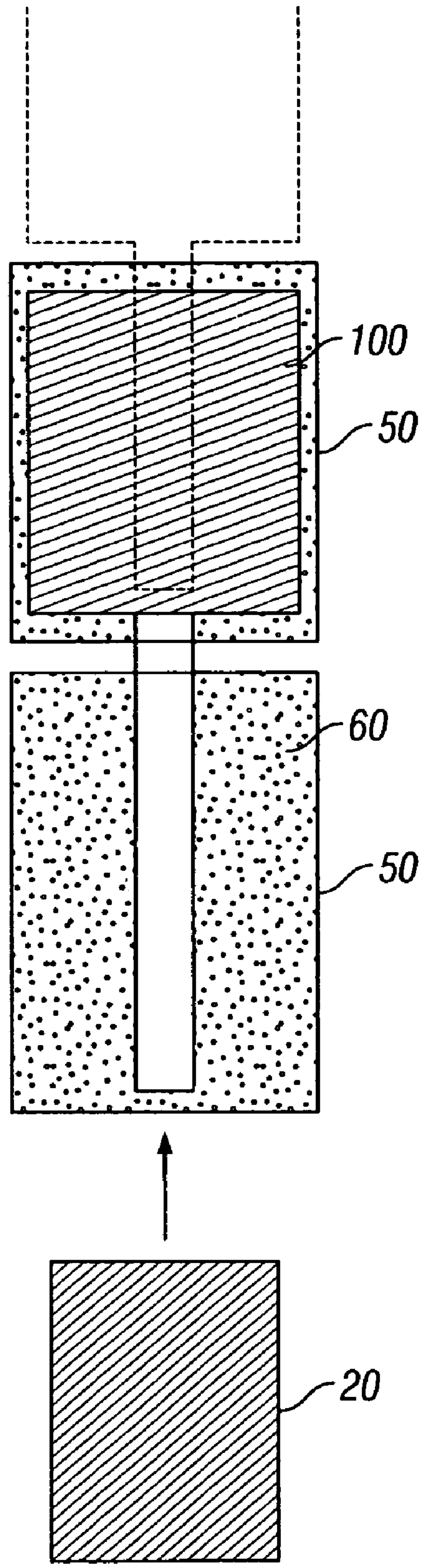
FIG. 4 is a drawing showing a top view of an embodiment of the present invention wherein an internal reference card is used to generate an internal reference signal.

In another embodiment, as shown in FIG. 4, internal reference card 100, having a surface which matches that of key 20, is disposed such that it, in a manner similar to that of key 20, is made to produce a reference signal. Using microcontroller 90, this reference signal can then be compared to that of key 20, and if a sufficient match is determined to exist, an electrical signal can be produced which deactivates lock 40.

Since the lock of the present invention compares the signature produced by the card to that of an expected value, the lock of the present invention can easily be connected to a computer network which provides the reference value to microcontroller 90.

Microcontroller 90 can be pre-programmed to recognize different cards at different times. For example a clock in microcontroller 90 can be used to determine which particular reference value to use an any given time. Thus, the lock can be programmed to accept a different card for each day of the week. This is easily done by providing several reference values to microcontroller 90 at the time it is programmed.

Figure 5:
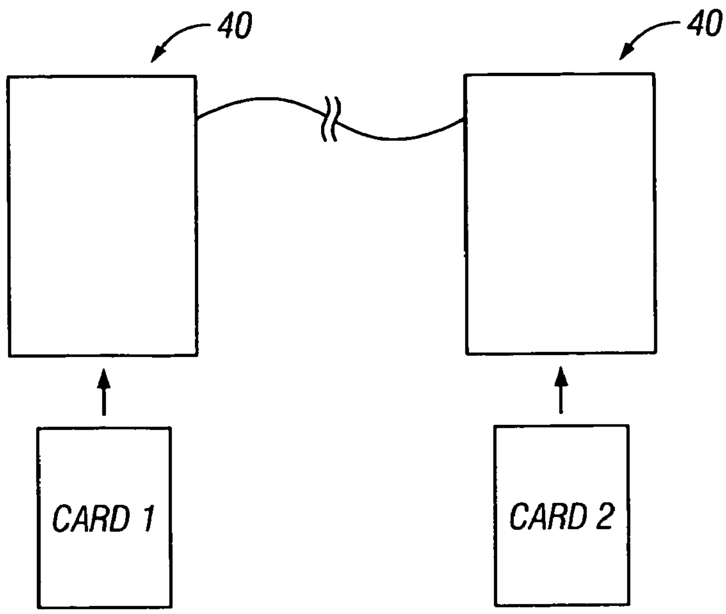
FIG. 5 is a top view drawing showing two lock mechanisms and a separate card for each, the lock mechanisms being electrically connected to one another.

As shown in FIG. 5, a plurality of locks 40 can be connected together and microcontroller(s) 90 programmed to only deactivate lock(s) 40 when each is deactivated by its respective card within a certain period of time of one another. In this manner it can be required that two different cards, one for each lock, be used within ½ of a second of each other, thus creating a confirmation effect. Locks 40 in this embodiment can be connected through a network such that one of locks 40 is located in a more secure headquarters type area.

Figure 6:
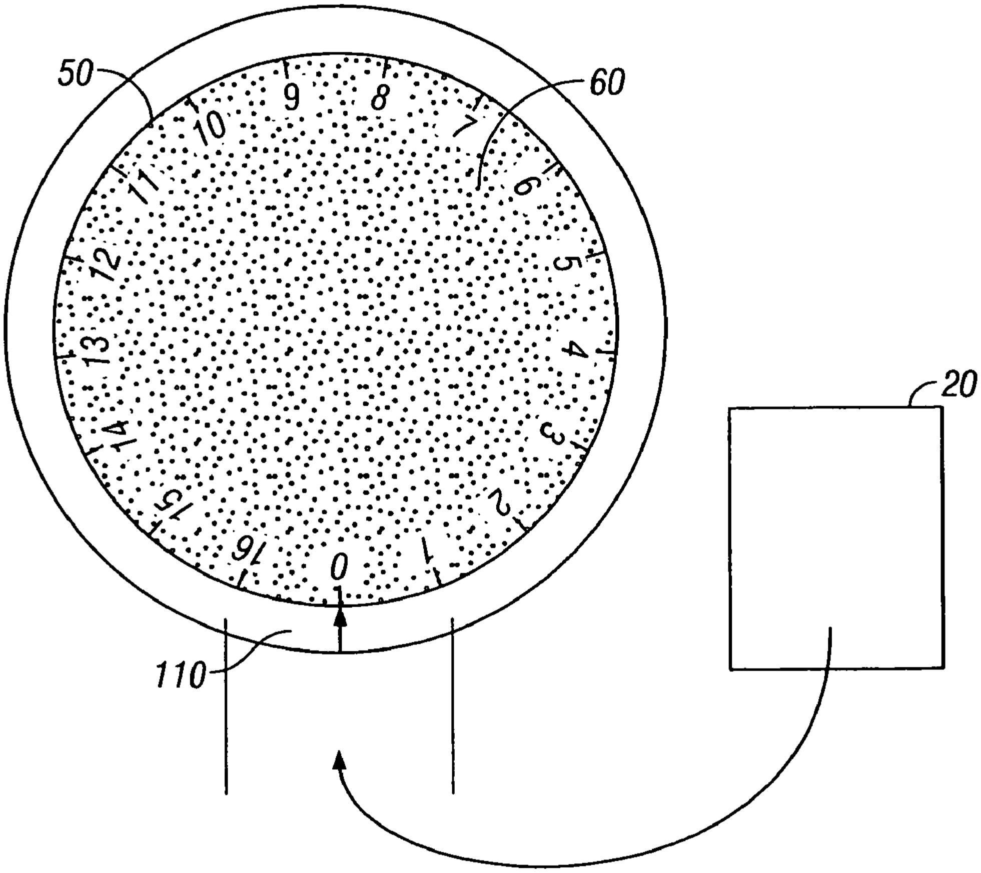
FIG. 6 is a top view drawing showing a rotatably positionable element of the lock, as well as a key.

Referring now to FIG. 6, in an alternate embodiment, element 50 of lock 40 can be disposed in such a manner that that the insertion angle of card 20 can easily be varied. As depicted in the FIG. 6, element 50 can be rotated with respect to card insertion point 110. By rotating element 50 even slightly, results in the sensor (not shown) detecting a different signal. Thus, a near infinite combination of possibilities can be produced from a single card and a single element simply by varying the angle of insertion. Microcontroller 90 can thus be programmed to deactivate a lock not only when a particular key is used, but further when a particular key is used in a particular sequence of insertions wherein the angle of insertion is altered by a particular amount each time. For example, microcontroller 90 can easily be programmed to compare four reference numbers in sequence and only deactivate a lock if an exact match of those four reference numbers is found. Microcontroller 90 could thus be programmed to deactivate a lock when a particular card is used in the sequence of 4-16-2-8.

Figure 7A:
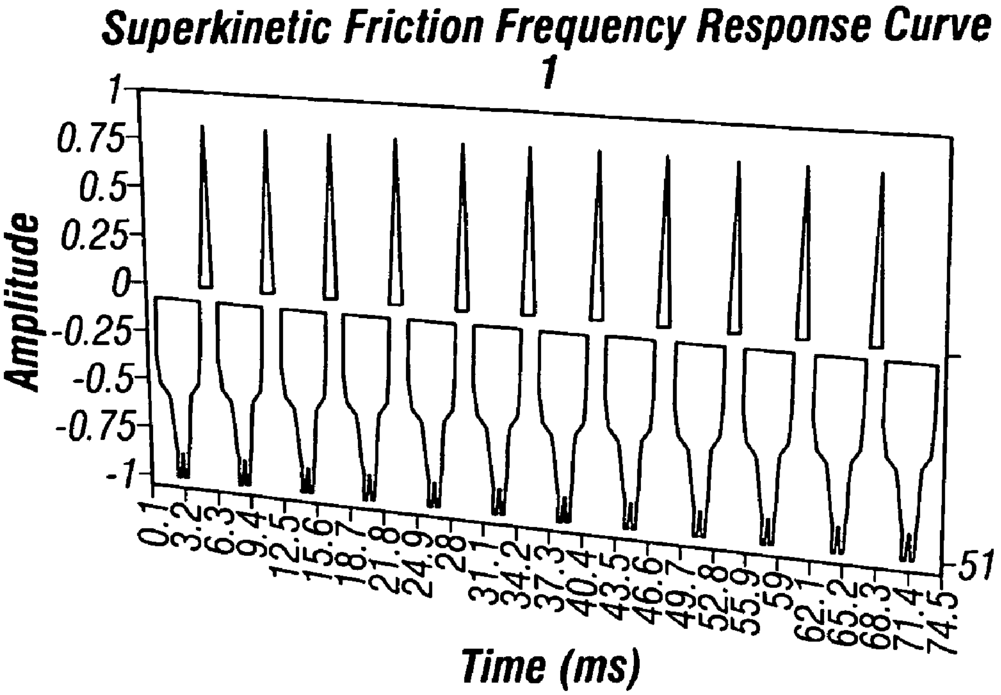
FIGS. 7A and 7B are computer-generated representations of exemplary reference and measured signals.
Figure 7B:
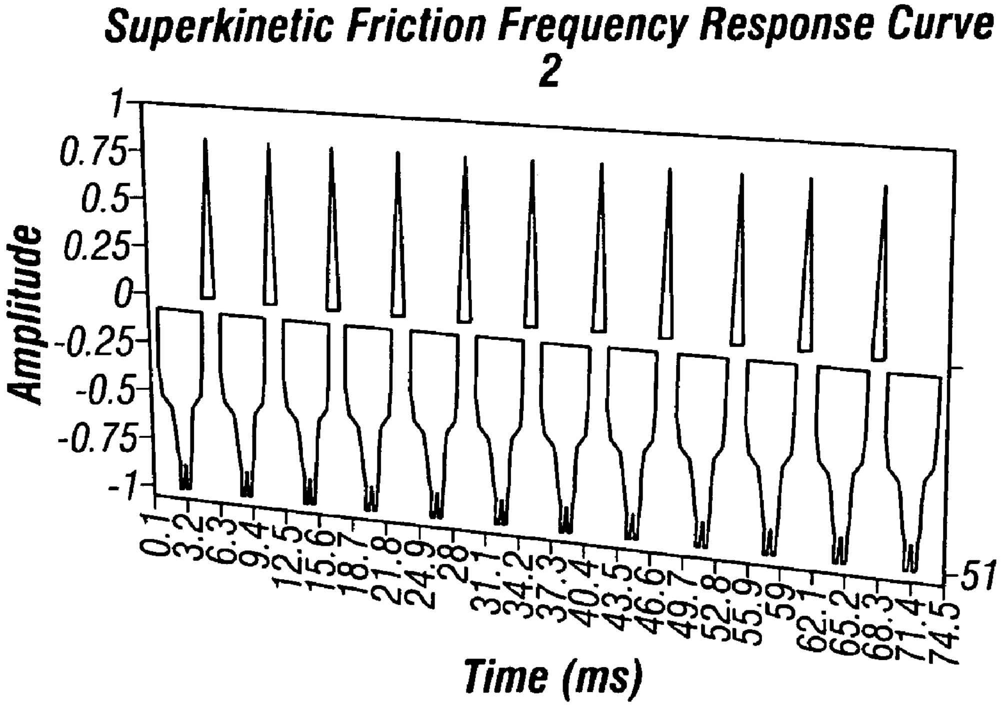

FIGS. 7A and 7B are exemplary representations of the reference signal and measured signal comparison that occurs. In order for a match to occur the signals must correlate to each other with a pre-determined accuracy value.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above are hereby incorporated by reference.

What is claimed is:

1. A lock deactivating or activating mechanism comprising:

a sensor detecting a friction force pattern generated from sliding a first nanopatterned surface comprising a key past a second nanopatterned surface comprising a lock element, said friction force pattern resulting from changes in distance between said first and second nanopatterned surfaces; and a controller receiving output from said sensor and comparing same to stored values.

2. The mechanism of claim 1 further comprising an amplifier between said sensor and said controller.

3. The mechanism of claim 1 wherein said first surface is disposed on an element which is fixedly secured within an enclosure.

4. The mechanism of claim 1 wherein said second surface is disposed on a structure which is not fixedly secured within an enclosure.

5. The mechanism of claim 1 wherein said sensor comprises a tribometer.

6. The mechanism of claim 1 wherein said sensor detects friction between engaging features with a feature size of less than or equal to approximately 4 microns in pitch and 1 micron in depth.

7. The mechanism of claim 6 wherein said sensor detects friction between engaging features with a feature size of approximately 3 in pitch and 0.5 microns in depth.

8. The mechanism of claim 1 wherein said first and second nanopatterned surfaces are rotatably positionable with respect to one another.

9. The mechanism of claim 8 wherein the controller requires a particular sequence of engagements of said first and second surfaces at a plurality of angles.

10. The mechanism of claim 1 wherein the controller requires engagement of both said second and one or more additional surfaces.

11. A method for activating or deactivating a lock, the method comprising the steps of:

providing a first nanopatterned surface comprising a key;

generating a friction force pattern via causing a second nanopatterned surface comprising a lock element to frictionally interact with the first nanopatterned surface;

sensing the friction force pattern generated by the interaction with a sensor, the sensor producing an output signal; and via a controller comparing the sensor output signal to a reference signal.

12. The method of claim 11 further comprising providing an amplifier between the sensor and the controller.

13. The method of claim 11 wherein the first surface is disposed on an element which is fixedly secured within an enclosure.

14. The method of claim 11 wherein the second surface is disposed on a structure which is not fixedly secured within an enclosure.

15. The method of claim 11 wherein the sensor comprises a tribometer.

16. The method of claim 11 wherein the sensor detects friction between engaging features with a feature size of less than or equal to approximately 4 microns in pitch and 1 micron in depth.

17. The method of claim 16 wherein the sensor detects friction between engaging features with a feature size of approximately 3 in pitch and 0.5 microns in depth.

18. The method of claim 11 wherein the first and second surfaces are rotatably positionable with respect to one another.

19. The method of claim 18 wherein the controller requires a particular sequence of engagements of the first and second surfaces at a plurality of angles.

20. The method of claim 11 wherein the controller requires engagement of both the second and one or more additional surfaces.

* * * * *

UNITED STATES PATENT AND TRADEMARK OFFICE

CERTIFICATE OF CORRECTION

| | | |
|---|---|---|
| PATENT NO. | : 7,667,570 B1 | Page 1 of 1 |
| APPLICATION NO. | : 11/128505 | |
| DATED | : February 23, 2010 | |
| INVENTOR(S) | : Christian Adams | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Seventh Day of December, 2010

David J. Kappos

*Director of the United States Patent and Trademark Office*